(12) United States Patent
Gallant et al.

(10) Patent No.: US 11,927,375 B2
(45) Date of Patent: Mar. 12, 2024

(54) SUCTION HEAT EXCHANGER DE-MISTING FUNCTION

(71) Applicant: TRANE INTERNATIONAL INC., Davidson, NC (US)

(72) Inventors: Erica L. Gallant, Onalaska, WI (US); Justin D. Piggush, La Crosse, WI (US); Jon P. Hartfield, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 30 days.

(21) Appl. No.: 17/649,652

(22) Filed: Feb. 1, 2022

(65) Prior Publication Data

US 2023/0288106 A1 Sep. 14, 2023

(51) Int. Cl.
*F25B 39/02* (2006.01)
*B01D 1/30* (2006.01)
(Continued)

(52) U.S. Cl.
CPC .............. *F25B 39/02* (2013.01); *B01D 1/305* (2013.01); *F25B 40/00* (2013.01); *F25B 40/06* (2013.01);
(Continued)

(58) Field of Classification Search
CPC ..... F25B 39/02; F25B 40/06; F25B 2339/024
See application file for complete search history.

(56) References Cited

U.S. PATENT DOCUMENTS 3,412,569 A * 11/1968 Arledge, Jr. ............ F25B 39/02
62/504
3,481,151 A * 12/1969 Seeley ................... F25B 47/006
62/278
(Continued)

FOREIGN PATENT DOCUMENTS

CN      101749247 A    6/2010
CN      106796066 A    5/2017
(Continued)

OTHER PUBLICATIONS

International Search Report and Written Opinion, International Patent Application No. PCT/US2019/063839, dated May 25, 2020 (15 pages).
(Continued)

*Primary Examiner* — Christopher R Zerphey
(74) *Attorney, Agent, or Firm* — Hamre, Schumann, Mueller & Larson, P.C.

(57) ABSTRACT

A liquid-vapor separator includes a housing, an inlet disposed on the housing and configured to receive a working fluid into the housing, a vapor stream outlet disposed on the housing and configured to release a vapor stream of the working fluid, and a demister disposed in the housing and configured to transfer thermal energy between the working fluid and the vapor stream. In some embodiments, the working fluid absorbs thermal energy and evaporates to provide the vapor stream that includes entrained droplets. At least a portion of the entrained droplets absorbs thermal energy from the working fluid to evaporate when the vapor stream flows through the demister. In some embodiments, the liquid-vapor separator includes a passive demisting portion that demists by obstructing at least a portion of the entrained droplets.

18 Claims, 11 Drawing Sheets

(51) Int. Cl.
*F25B 40/00* (2006.01)
*F25B 40/02* (2006.01)
*F25B 40/06* (2006.01)
*F25B 43/00* (2006.01)
*F28F 1/12* (2006.01)
*F28F 1/32* (2006.01)

(52) U.S. Cl.
CPC .............. *F25B 43/00* (2013.01); *F28F 1/126* (2013.01); *F28F 1/32* (2013.01); *F28F 1/325* (2013.01); *F25B 40/02* (2013.01); *F25B 2339/0242* (2013.01); *F25B 2400/05* (2013.01); *F25B 2400/23* (2013.01); *F25B 2500/28* (2013.01)

(56) References Cited

U.S. PATENT DOCUMENTS

| | | | |
|---|---|---|---|
| 3,681,896 A * | 8/1972 | Velkoff | F28F 13/16 62/3.4 |
| 4,825,661 A * | 5/1989 | Holtzapple | F25B 41/335 62/515 |
| 6,182,467 B1 | 2/2001 | Zhong et al. | |
| 6,293,112 B1 * | 9/2001 | Moeykens | F28D 3/04 62/84 |
| 6,550,258 B1 | 4/2003 | Shoulders | |
| 6,901,763 B2 | 6/2005 | Memory et al. | |
| 6,910,349 B2 * | 6/2005 | Bodell, II | F25B 41/40 62/515 |
| 7,833,298 B2 | 11/2010 | Larnholm et al. | |
| 8,640,491 B2 | 2/2014 | Shoulders | |
| 8,857,798 B1 | 10/2014 | Sparrow et al. | |
| 8,974,688 B2 | 3/2015 | Yana Motta et al. | |
| 9,234,685 B2 | 1/2016 | Koppineedi | |
| 9,541,311 B2 | 1/2017 | Hinde et al. | |
| 9,797,639 B2 | 10/2017 | Schmidt | |
| 9,810,458 B2 * | 11/2017 | Hattori | B01D 1/065 |
| 10,746,441 B2 | 8/2020 | Numata et al. | |
| 2008/0041096 A1 * | 2/2008 | Sakashita | F28D 21/0017 62/515 |
| 2010/0132927 A1 * | 6/2010 | Benetton | F25B 40/06 165/157 |
| 2011/0023507 A1 | 2/2011 | Yana Motta et al. | |
| 2016/0102901 A1 | 4/2016 | Christensen et al. | |
| 2016/0107113 A1 | 4/2016 | Brown | |
| 2017/0138652 A1 | 5/2017 | Hattori et al. | |
| 2017/0234586 A1 | 8/2017 | Lv et al. | |
| 2017/0248352 A1 | 8/2017 | MacBain et al. | |
| 2018/0117991 A1 | 5/2018 | Kim et al. | |
| 2018/0298259 A1 | 10/2018 | Itano et al. | |
| 2019/0063801 A1 | 2/2019 | Miyoshi et al. | |
| 2019/0161660 A1 | 5/2019 | Yana Motta et al. | |

FOREIGN PATENT DOCUMENTS

| | | | |
|---|---|---|---|
| CN | 108016235 A | 5/2018 | |
| EP | 1083395 A1 | 3/2001 | |
| GB | 560060 A * | 3/1944 | B01D 1/0082 |
| GB | 2508614 A | 6/2014 | |
| JP | 2006-283675 A | 10/2006 | |
| KR | 20140091139 A | 7/2014 | |
| WO | 2011/023192 A2 | 3/2011 | |
| WO | 2016/057492 A1 | 4/2016 | |
| WO | 2020/113152 A2 | 6/2020 | |

OTHER PUBLICATIONS

Extended European Search Report, European Patent Application No. 19212539.1. dated Jan. 24, 2020 (8 pages).
Extended European Search Report, European Patent Application No. 19891500.1, dated Aug. 23, 2021 (7 pages).
Office Action, Chinese Patent Application No. 201980090993.7, dated Jul. 25, 2022, with [partial English translation (14 pages).
Extended European Search Report, European Patent Application No. 23154230.9, dated Jun. 7, 2023 (8 pages).

* cited by examiner

SUCTION HEAT EXCHANGER DE-MISTING FUNCTION

FIELD

This disclosure relates to heating, ventilation, air conditioning, and refrigeration ("HVACR") systems having a demister to remove entrained droplets in a vapor stream leaving a liquid-vapor separator. Particularly, the demister includes a vapor heater disposed in the vapor stream using the thermal energy of the liquid stream entering the liquid-vapor separator to demist the vapor stream by evaporating the entrained droplets.

BACKGROUND

In an HVACR system, such as a chiller, the evaporator converts refrigerant from a liquid phase to a vapor phase. In some applications, the refrigerant enters the evaporator, absorbs thermal energy, evaporates into a vapor phase, and leaves the evaporator as a vapor stream. Certain flow rates of the vapor phase leaving the evaporator can carry refrigerant droplets in the vapor creating entrained droplets in the vapor stream leaving the evaporator. The entrained droplets can complicate subsequent process control, reduce the efficiency of the HVACR system, and cause damages, for example, to the compressor.

SUMMARY

This disclosure relates to a heating, ventilation, air conditioning, and refrigeration ("HVACR") system having a demister to remove entrained droplets in a vapor stream leaving a liquid-vapor separator. Particularly, the demister includes a vapor heater disposed in the vapor stream using the thermal energy of the liquid stream entering the liquid-vapor separator to demist the vapor stream by evaporating the entrained droplets.

In an embodiment, a liquid-vapor separator includes a housing, an inlet disposed on the housing and configured to receive a working fluid into the housing, a vapor stream outlet disposed on the housing and configured to release a vapor stream of the working fluid, and a demister, The demister is disposed in the housing and configured to transfer thermal energy between the working fluid and the vapor stream, such that at least a portion of the entrained droplets absorb thermal energy from the working fluid to evaporate said portion of the entrained droplets when the vapor stream flows through the demister.

In an embodiment, the liquid-vapor separator further includes an expander disposed in the housing, wherein the expander is configured to expand the working fluid.

In an embodiment, the liquid-vapor separator includes a vapor heater disposed in the housing, where the vapor heater is configured to provide thermal energy to the working fluid in the liquid-vapor separator and is in thermal communication with the working fluid to supply thermal energy to provide the vapor stream.

In an embodiment, the demister includes a tortuous path in which at least a portion of the vapor stream flows through. In an embodiment, a fin matrix disposed on the demister creates the tortuous path.

In an embodiment, the demister includes a passive demisting portion configured to obstruct at least a portion of the entrained droplets.

In an embodiment, the demister is configured to electrostatically attract the entrained droplets.

In an embodiment, the liquid-vapor separator is an evaporator or an economizer.

In an embodiment, an HVACR system includes a compressor, a condenser a first expander; and a first liquid-vapor separator in fluid communication. The first liquid-vapor separator includes a first housing, a first inlet disposed on the first housing and configured to receive a working fluid, a first vapor stream outlet disposed on the first housing and configured to release a first vapor stream of the working fluid to the compressor, and a first demister. The first demister is disposed in the first housing and configured to transfer thermal energy between the working fluid and the first vapor stream, such that at least a portion of the first plurality of entrained droplets absorb thermal energy from the working fluid to evaporate said portion of the first plurality of the entrained droplets when the first vapor stream flows through the first demister.

In an embodiment, the HVACR system further includes a second liquid-vapor separator in fluid communication via the working fluid. The second liquid-vapor separator includes a second housing, a second inlet disposed on the second housing and configured to receive the working fluid, a second vapor stream outlet disposed on the second housing and configured to release a second vapor stream of the working fluid, a liquid stream outlet disposed on the second housing and configured to release a liquid stream of the working fluid to the first inlet, and a second demister disposed in the second housing. The second demister is configured to transfer thermal energy between the working fluid and the second vapor stream such that at least a portion of the second plurality of entrained droplets absorbs thermal energy from the working fluid to evaporate said portion of the second plurality of entrained droplets when the second vapor stream flows through the second demister.

In an embodiment, the first liquid-vapor separator is an evaporator and the second liquid-vapor separator is an economizer.

In an embodiment, a method includes flowing a working fluid into a liquid-vapor separator, the liquid-vapor separator including a headspace, a heat exchange section, and a demister; The method further includes evaporating the working fluid by way of the heat exchange section to obtain a vapor stream of the working fluid, the vapor stream including entrained droplets and flowing the vapor stream through a demister. The vapor stream absorbs heat at the demister such that at least a portion of the entrained droplets are evaporated.

In an embodiment, the method further includes receiving the vapor stream at a compressor after the vapor stream has been flowed through the demister and compressing the vapor stream using the compressor.

In an embodiment, the method further includes obstructing a passage of at least a portion of the entrained droplets through the demister by way of one or more tortuous paths included in the demister.

In an embodiment, the method further includes the working fluid passing through an expander to enter the heat exchange section.

In an embodiment, the absorption of heat by the vapor stream at the demister superheats said vapor stream.

By using a demister heated by a liquid stream of working fluid to actively demist the vapor stream, the liquid-vapor separator can demist without requiring a secondary heat source, reducing HVACR systems complexity, and increasing efficiency. Entrained droplets in a vapor stream can compromise, for example, a compressor that receives the vapor stream. For example, the entrained droplets being working fluid in a liquid form, when received at a suction line of a compressor, can cause oil dilution or liquid impingement within the compressor. The capacity of some liquid-vapor separators can be limited by a maximum amount of entrained droplets in the vapor stream. While reducing a flow rate of the vapor stream, for example, by enlarging the headspace or reducing an operating capacity of the liquid-vapor separators can reduce the amount of entrained droplets leaving the liquid-vapor separators, by actively demisting the vapor stream, a vapor-liquid separator can be improved by an increased operating capacity or a reduced headspace that occupies less space.

BRIEF DESCRIPTION OF THE DRAWINGS

Like reference numbers represent like parts throughout.

DETAILED DESCRIPTION

This disclosure relates to a heating, ventilation, air conditioning, and refrigeration ("HVACR") system having a demister to remove entrained droplets in a vapor stream leaving a liquid-vapor separator. Particularly, the demister includes a vapor heater disposed in the vapor stream using the thermal energy of the liquid stream entering the liquid-vapor separator to demist the vapor stream by evaporating the entrained droplets. The vapor heater can provide thermal energy to a body of fluid. The vapor heater can include an electric or gas heating element, a heat exchanger (e.g., a shell and tube heat exchanger, a finned tube heat exchanger, or the like), a combination thereof, or the like.

Figure 1:
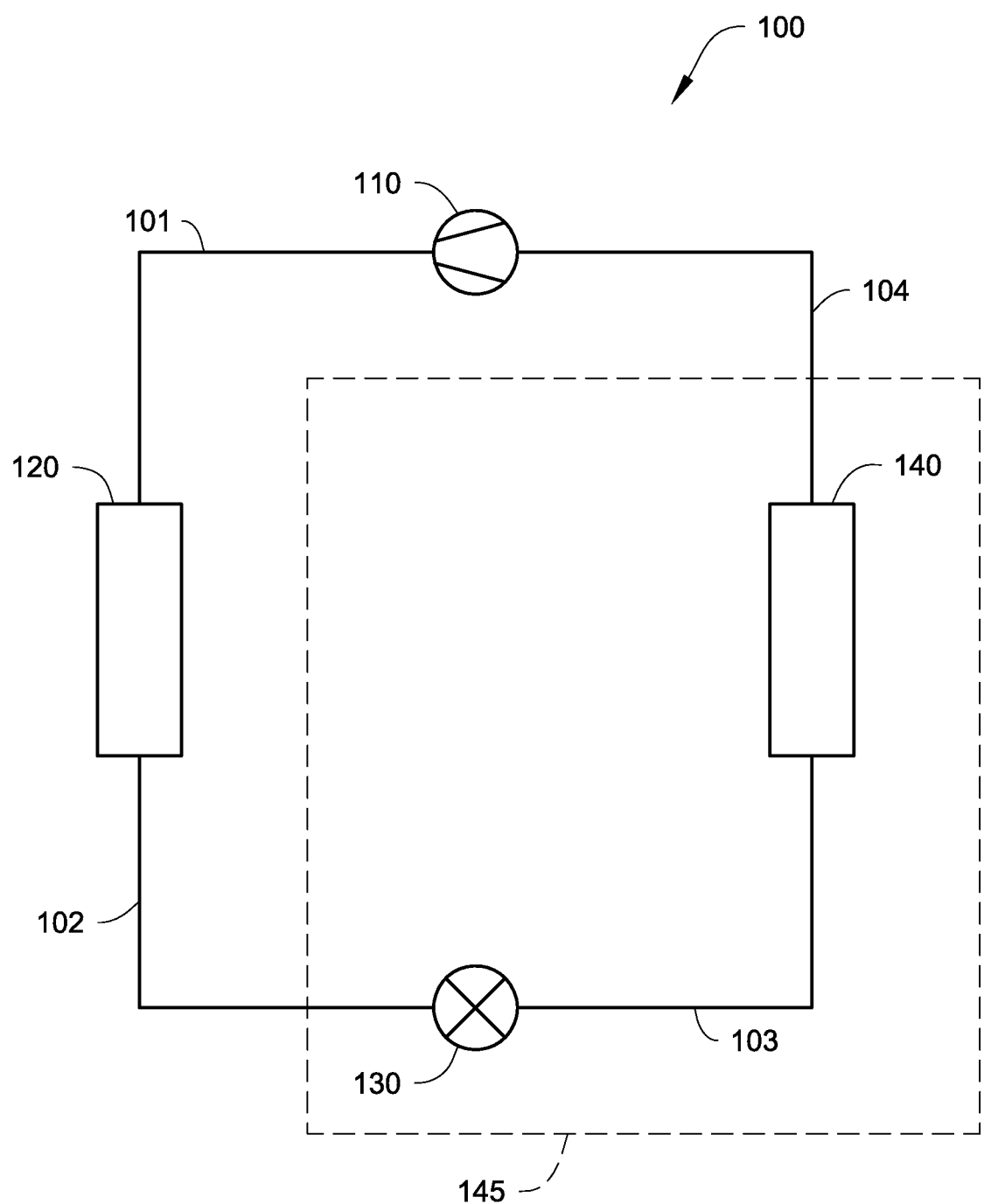
FIG. 1 is a schematic diagram of an HVACR system, according to an embodiment.

FIG. 1 is a schematic diagram of an HVACR system 100, according to an embodiment. The HVACR system 100 includes a compressor 110, a condenser 120, an expander 130, and a first liquid-vapor separator 140 configured to condition a conditioned space. The HVACR system 100 is an example that can be modifiable to include additional components. For example, in an embodiment, the HVACR system 100 can include other components such as, but not limited to, an economizer heat exchanger, one or more flow control devices, a receiver tank, a dryer, one or more additional heat exchanger, a separator, or the like. In some embodiments, the first liquid-vapor separator 140 can be an evaporator to evaporate a liquid phase refrigerant into a vapor phase to provide the vapor stream. In some embodiments, the evaporator can include a heat exchanger (i.e., a tube heat exchanger, a finned tube heat exchanger, or the like), a heater (i.e., a gas heater, an electric heater, or the like) or a combination thereof. In some embodiments, the first liquid-vapor separator 140 can be, for example, a flash tank that separates a vapor stream from a liquid stream by pressure change, with or without additional heat exchange structures (e.g., a gas or electric heater, a heat exchanger, or the like). In some embodiments, the first liquid-vapor separator 140 can be, for example, an evaporator that separates a vapor stream from a liquid stream by evaporating and/or heating the liquid stream to produce and releasing the vapor stream. In some embodiments, the first liquid-vapor separator 140 is an economizer. In some embodiments, the first liquid-vapor separator 140 can have the structures and/or functions of an evaporator and a flash tank combined.

The HVACR system 100 is generally applicable in a variety of systems used to control an environmental condition (e.g., temperature, humidity, air quality, or the like) in a space (generally referred to as a conditioned space). Examples of such systems include, but are not limited to, residential, commercial, or industrial HVACR systems, transport refrigeration systems, or the like.

The HVACR system 100 includes the compressor 110, the condenser 120, the expander 130, and the first liquid-vapor separator 140 fluidly connected via conduits 101, 102, 103, and 104.

In an embodiment, the HVACR system 100 is configured to be a cooling system (e.g., an air conditioning system) capable of operating in a cooling mode. In an embodiment, the HVACR system 100 is configured to be a heat pump system that can operate in both a cooling mode and a heating/defrost mode.

The HVACR system 100 can operate according to generally known principles. The HVACR system 110 can be configured to heat or cool a process fluid (e.g., a heat transfer medium or fluid such as, but not limited to, water, air or the like), in which case the HVACR system 100 may be generally representative of an air conditioner or heat pump.

In operation, the compressor 110 compresses a working fluid (e.g., a heat transfer fluid such as a refrigerant or the like) from a relatively lower pressure gas (e.g., suction pressure) to a relatively higher-pressure gas (e.g., discharge pressure). In an embodiment, the compressor 110 can be a positive displacement compressor. In an embodiment, the positive displacement compressor can be a screw compressor, a scroll compressor, a reciprocating compressor, a centrifugal compressor, or the like.

The relatively higher-pressure gas is at a relatively higher temperature, which is discharged from the compressor 110 and flows through conduit 101 to the condenser 120. The working fluid flows through the condenser 120 and rejects heat to a process fluid (e.g., water, air, or the like), thereby cooling the working fluid. The cooled working fluid flows to the expander 130 via conduit 102. In an embodiment, the expander 130 can be an expansion valve, expansion plate, expansion vessel, orifice, or the like, or other suitable types of expansion mechanisms. It is to be appreciated that the expander 130 may be any type of expanders used in the field for expanding a working fluid to cause the working fluid to decrease in temperature and pressure.

The expander 130 reduces the pressure of the working fluid. The working fluid flows to the first liquid-vapor separator 140 via conduit 103. The working fluid flows through the first liquid-vapor separator 140, where it absorbs thermal energy from a process fluid (e.g., water, air, or the like), heating the working fluid. In some embodiments, at least a portion of the heated working fluid absorbs thermal energy in the first liquid-vapor separator 140 and evaporates to provide a vapor stream of the working fluid. The vapor stream can be provided to the compressor 110 via conduit 104. The vapor stream can carry some working fluid in a liquid form due to, for example, the updraft near a liquid-vapor interface of the working fluid in the first liquid-vapor separator 140, creating entrained droplets.

The heated working fluid, and/or the vapor stream, then returns to the compressor 110 via the conduit 104. The above-described process continues while the HVACR system 100 is operating, for example, in a cooling mode (e.g., while the compressor 110 is enabled).

In some embodiments, at least a portion of the conduit 102 and/or 103 is disposed in the vapor stream and configured to exchange thermal energy with the vapor stream. A temperature of the working fluid in the conduit 102 and/or 103 is higher than the evaporating temperature of the working fluid in the vapor stream, evaporating at least a portion of entrained droplets in the vapor stream.

In some embodiments, the expander 130 and the first liquid-vapor separator 140 can be disposed within a housing 145. In some embodiments, at least a portion of the conduits 102 and/or 103 can be disposed within the housing 145.

Figure 2:
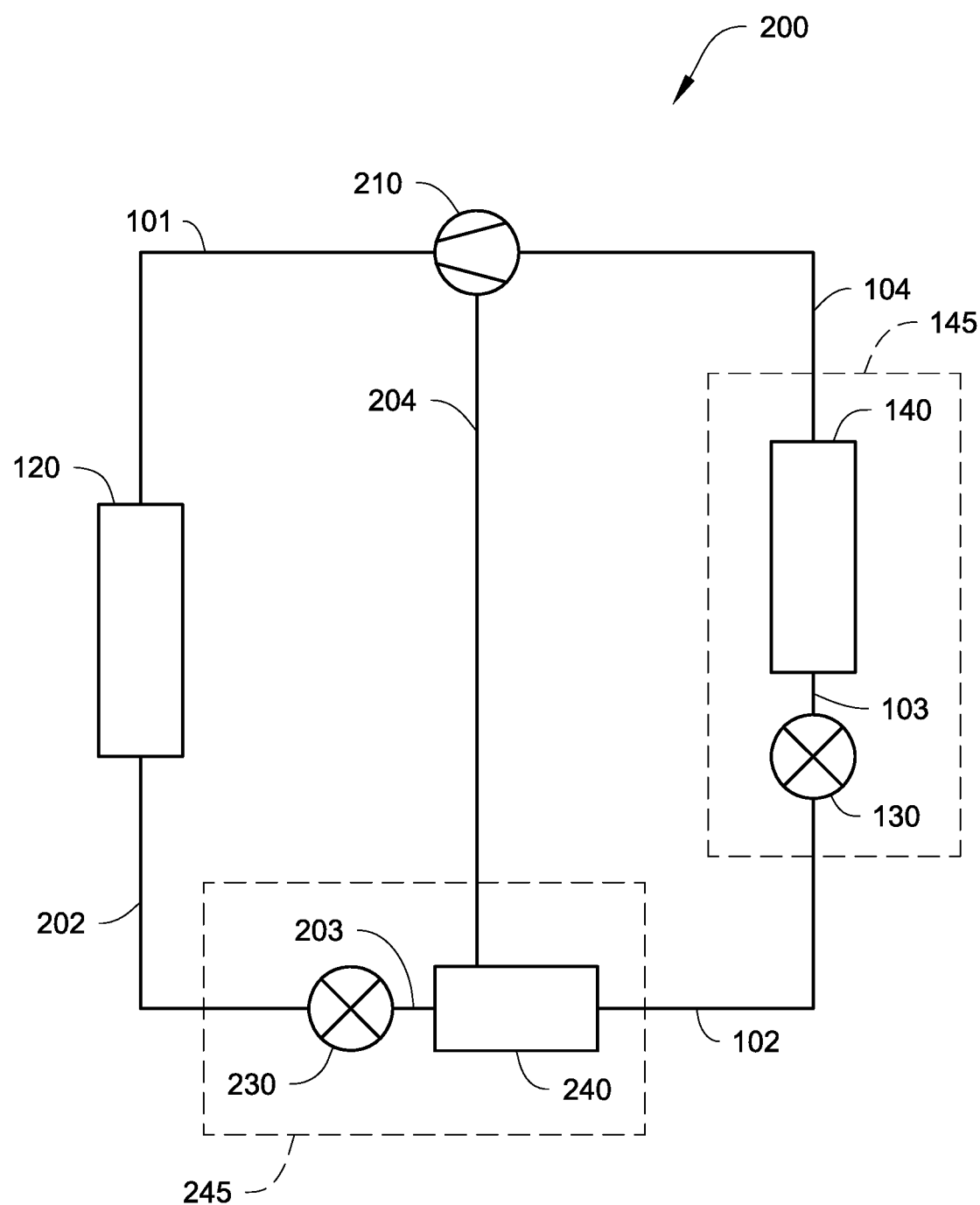
FIG. 2 is a schematic diagram of an HVACR system, according to another embodiment.

FIG. 2 is a schematic diagram of an HVACR system 200, according to an embodiment. The HVACR system 200 includes the condenser 120, the expander 130, and the first liquid-vapor separator 140 as shown and described for FIG. 1. The HVACR system 200 can further include a compressor 210, a second expander 230, and a second liquid-vapor separator 240. In some embodiments, the second liquid-vapor separator 240 can be an economizer, a flash tank, an evaporator, combinations thereof, or the like.

The HVACR system 200 is configured to condition a conditioned space. The HVACR system 200 can include additional components. In an embodiment, the HVACR system 100 can include other components such as, but not limited to, an economizer heat exchanger, one or more flow control devices, a receiver tank, a dryer, one or more additional heat exchangers, or the like.

The HVACR system 200 includes the compressor 210, the condenser 120, the first expander 130, the first liquid-vapor separator 140, the second expander 230, and the second liquid-vapor separator 240 fluidly connected via conduits 101, 102, 103, 104, 202, 203, and 204.

The compressor 210 can be one or more compressors with one or more stages. In an embodiment, compressor 210 is a multi-stage compressor. In an embodiment, compressor 210 is a two-stage compressor. In some embodiments, the compressor 210 can include one or more single or multiple-stage compressor(s). The second expander 230 and the second liquid-vapor separator 240 can respectively have the same or similar structures and/or functions of the first expander 130 and the first liquid-vapor separator 140. In some embodiments, the second liquid-vapor separator 240 is an economizer such as a flash tank.

The cooled working fluid flows from the condenser 120 to the second expander 230 via the conduit 202. The second expander 230 reduces the pressure of the working fluid from the conduit 202. The working fluid then flows to the second liquid-vapor separator 240 via the conduit 203. The working fluid flows through the second liquid-vapor separator 240. In some embodiments, at least a portion of the heated working fluid absorbs thermal energy in the second liquid-vapor separator 240 and evaporates to provide a vapor stream of the working fluid. The vapor stream can be provided to the compressor 210 via the conduit 204.

The vapor stream can carry working fluid in a liquid form due to, for example, the updraft near a liquid-vapor interface of the working fluid in the second liquid-vapor separator 240, creating entrained droplets. At least a portion of the working fluid remains in liquid form, providing a liquid stream of the working fluid leaving the second liquid-vapor separator 240. In some embodiments, the portion of the working fluid that provides the vapor stream can evaporate by absorbing thermal energy from the portion of working fluid remained in liquid form. In some embodiments, the thermal energy to evaporate the portion of the working fluid to provide the vapor stream can be provided by a heater. Examples of the heater can be a gas heater, an electric heater, a heat exchanger, or the like. The liquid stream can then flow to the first expander 130 and the first liquid-vapor separator 140, being processed as shown and described above for FIG. 1.

In some embodiments, a portion of the conduits 202 and/or 203 is disposed in the vapor stream of the second liquid-vapor separator 240 and configured to exchange thermal energy with the vapor stream. A demister (further described below) can be disposed on this portion of conduit 202 and/or 203 for demisting entrained droplets. A temperature of the working fluid in the conduits 202 and/or 203 is higher than the evaporating temperature of the working fluid in the vapor stream, evaporating at least a portion of entrained droplets in the vapor stream. In some embodiments, the second expander 230 and the second liquid-vapor separator 240 can be disposed within a housing 245. At least a portion of the conduits 202 and/or 203 can be disposed within the housing 245. In some embodiments, the first liquid-vapor separator 140 and/or the second liquid-vapor separator 240 can be one or more liquid-vapor separators, economizers, flash tanks, a combination thereof, or the like.

Figure 3:
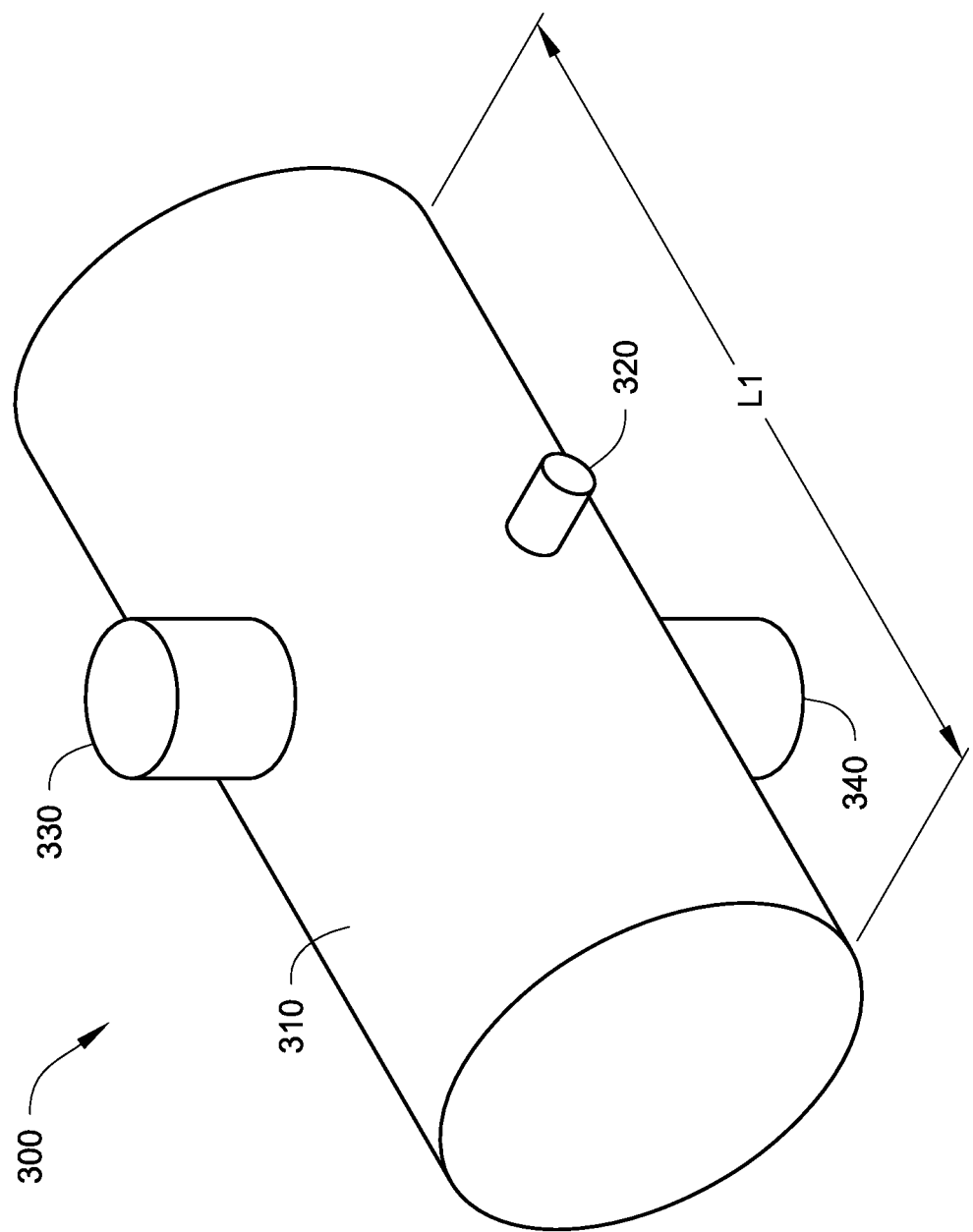
FIG. 3 is a perspective view of a liquid-vapor separator, according to an embodiment.

FIG. 3 is a perspective view of a liquid-vapor separator 300, according to an embodiment. The liquid-vapor separator 300 can separate a vapor stream from an inlet stream (e.g., liquid-vapor separator 140). Optionally, the liquid-vapor separator can provide a vapor stream and a liquid stream from the inlet stream (e.g., liquid-vapor separator 240). In some embodiments, the inlet stream can include a working fluid (e.g., heat transfer fluid, refrigerant, or the like).

The liquid-vapor separator 300 includes a housing 310 having a length L1. The inlet 320, the vapor stream outlet 330, and the liquid stream outlet 340 are disposed on the housing 310. The inlet 320 is configured to receive a working fluid, for example, from conduits 102, 202, 103, and/or 203 (shown in FIGS. 1 and 2). The working fluid received from the inlet 320 can be a liquid phase or predominately a liquid phase provided, for example, from a condenser (e.g., condenser 120 shown in FIGS. 1 and 2). The working fluid provided through the inlet 320 can be at a relatively high pressure and a relatively high temperature when compared to a temperature and/or a pressure of a vapor stream 380 as shown and described in FIG. 4 below.

Figure 4:
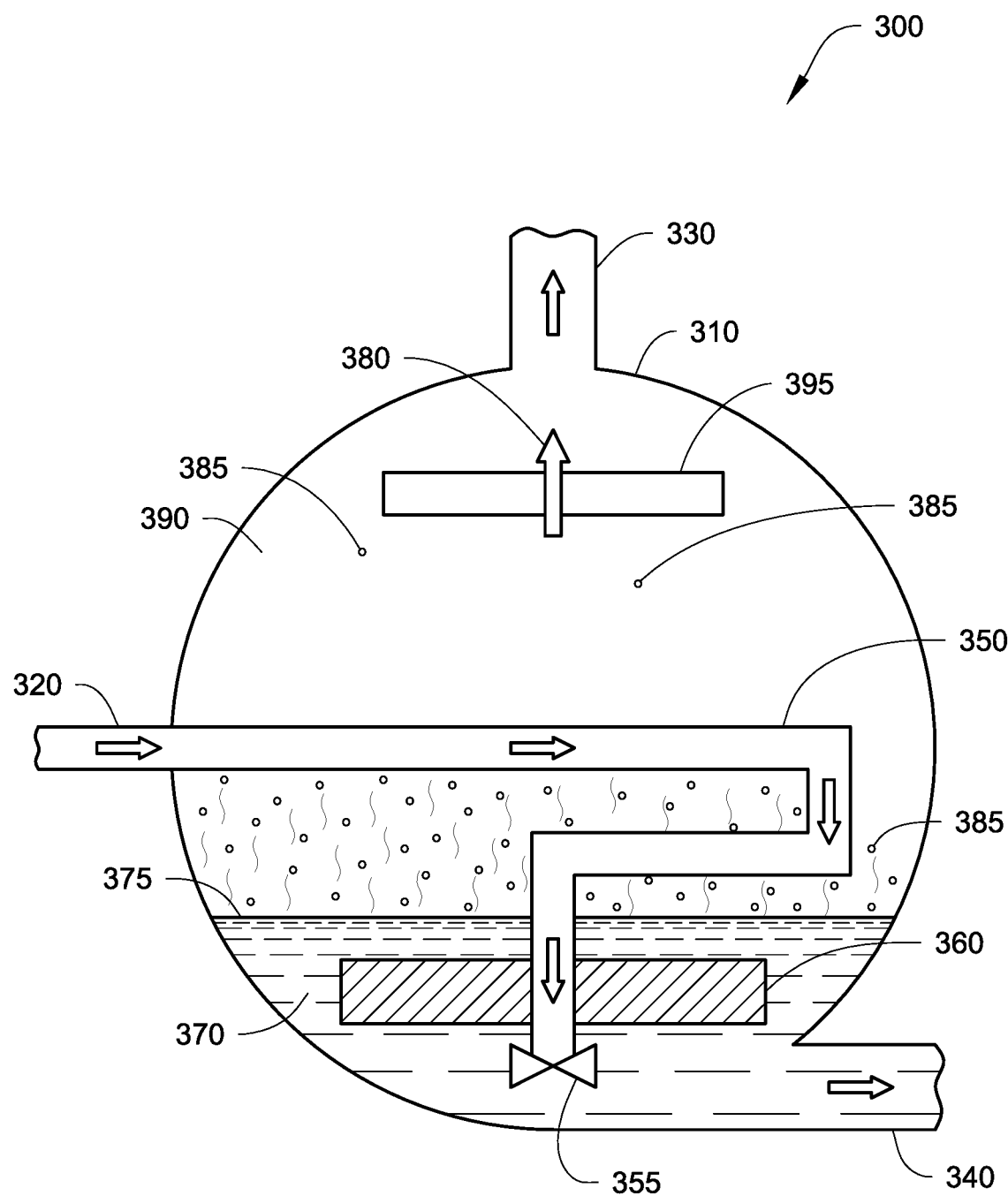
FIG. 4 is a cross-sectional view of the liquid-vapor separator of FIG. 3, according to an embodiment.

FIG. 4 is a cross-sectional view of the liquid-vapor separator 300 of FIG. 3, according to an embodiment. The cross-sectional view can be a view orthogonal to the length L1 to illustrate the internal structure of the liquid-vapor separator 300.

As shown in FIG. 4, the illustrative example of the liquid-vapor separator 300 can include the housing 310, the inlet 320, and the vapor stream outlet 330. In some embodiments, the liquid-vapor separator 300 can optionally include the liquid stream outlet 340, an expander 355, and a heat exchange module 360.

The inlet 320, the vapor stream outlet 330, and the liquid stream outlet 340 are disposed on the housing 310. The inlet 320 is configured to receive a working fluid, for example, from conduits 102, 202, 103, and/or 203 (shown in FIGS. 1 and 2). The working fluid received from the inlet 320 can be a liquid phase or predominately a liquid phase provided, for example, from a condenser (e.g., condenser 120 shown in FIGS. 1 and 2). The working fluid provided through the inlet 320 can be at a relatively high pressure and a relatively high temperature.

The working fluid provided through the inlet 320 can pool in a lower portion 370 of the housing 310. At least a portion of the working fluid in the lower portion 370 can absorb thermal energy and evaporate to provide a vapor stream 380 of the working fluid. The vapor stream 380 generally moves upward from the lower portion 370 to leave the housing via the vapor stream outlet 330. In some embodiments, the vapor stream 380 leaving the housing 310 can be provided to a compressor (e.g., the first compressor 110 or the second compressor 210) via conduits (e.g., conduits 104, 204).

In some embodiments, an expander 355 can lower the pressure of the working fluid before the working fluid pooled in the lower port 370. Lowering the pressure can lower the boiling temperature of the working fluid in the housing 310. The non-evaporating portion of the working fluid can lower its temperature to provide a least a portion of the thermal energy for evaporating the evaporating portion of the working fluid to provide the vapor stream 380. In some embodiments, the expander 355 can be the expander 130 and/or 230 as shown in FIGS. 1-2.

In some embodiments, a heat exchange module 360 can be disposed in the housing 310. The heat exchange module 360 can provide at least a portion of the thermal energy for evaporation and provide the vapor stream 380 with the entrained liquid 385. Examples of the heat exchange module 360 can include a gas heater, an electric heater, a heat exchanger for a fluid stream to exchange thermal energy (e.g., a shell and tube heat exchanger, a finned tube heat exchanger, or the like). The heat exchange module 360 can include a tube bundle, a finned tube structure, or the like. For example, the heat exchange module 360 can be a heat exchanger configured to exchange thermal energy between the working fluid and a process fluid (e.g., water, water mixture, air, or the like) that conditions a conditioned space. In some embodiments, the heat exchange module 360 is configured to heat working fluid in the lower portion 370.

A headspace 390 is disposed above the lower portion 370 in the housing 310. A liquid-vapor interface 375 can separate the headspace 390 and the lower portion 370. Working fluid in a liquid form can be carried into the vapor stream 380 as entrained droplets 385. The vapor stream 380 can include droplets especially when a flowrate of the vapor stream 380 is high, limiting a capacity of the liquid-vapor separator 300.

In some embodiments, the entrained droplets 385 can be created from an updraft of the vapor stream 380 at or near the liquid-vapor interface 375. Droplets created by, for example, boiling working fluid can cross the liquid-vapor interface 375 and be caught by the updraft in the headspace 390 entrained into the vapor stream 380 to create the entrained droplets 385 in the vapor stream 380.

A demister 350 is configured to demist a vapor stream (e.g., a vapor stream 380 of a working fluid) by removing at least a portion of the liquid (e.g., the entrained droplets 385) from the vapor stream. Demisting the liquid can be active, passive, or a combination thereof. Active demisting can include evaporating at least a portion of the liquid from the vapor stream. Passive demisting can include obstructing at least a portion of the liquid from the vapor stream.

In some embodiments, the demister 350 can demist the vapor stream 380 by providing thermal energy so that at least a portion of the entrained droplets 385 passing the demister 350 can be evaporated into a vapor phase. In some embodiments, the demister 350 can be disposed in the headspace 390 to evaporate at least a portion of the entrained droplets 385 when the vapor stream 380 flows through the headspace 390. In some embodiments, the demister 350 is disposed within the housing 310 and above the liquid-vapor interface 375.

For example, the demister 350 can include a vapor heater configured to evaporate the entrained droplets 385. The vapor heater of the demister 350 can be configured to exchange thermal energy between a first working fluid stream (e.g., the vapor stream 380 including the entrained droplets 385) and a second working fluid stream (e.g., the working fluid from the inlet 320).

The first working fluid stream can be a vapor stream (e.g., vapor stream 380) in the headspace (e.g., headspace 390) of a liquid-vapor separator (e.g. separator 300). The first working fluid stream can have a first temperature and a first pressure. The first temperature is at or about the evaporating or boiling temperature of the working fluid at the first pressure (e.g., the pressure in the liquid-vapor separator 300).

The second working fluid stream can have a second temperature and a second pressure. The second working fluid stream can be pressurized, for example, by a compressor (e.g., compressor 100). Compression of the working fluid can increase the temperature of the working fluid. The second working fluid stream can be the working fluid from a location in the refrigeration circuit having a temperature higher than the first temperature (e.g., an evaporating or boiling temperature of the entrained droplet 385 in the vapor stream 380). An expander (e.g., expander 355) can be disposed downstream from the second working fluid stream and upstream of the first working fluid stream to expand the working fluid and lower the pressure (e.g., from the second pressure to the first pressure).

It is appreciated that the expander (e.g., expander 355) can be disposed inside or outside of the liquid-vapor separator 300. The second working fluid stream can be a liquid stream, a predominately liquid stream, a vapor stream, a predominately vapor stream, or a combination thereof. For example, a second working fluid stream routed from the outlet of the compressor can be a vapor stream with a relatively high pressure with a relatively high temperature due to the compression by the compressor. The relatively high temperature can be higher than the boiling point temperature of the working fluid at a lower pressure in the headspace of the liquid-vapor separator 300.

In some embodiments, the demister 350 can passively demist the entrained droplets 385 by obstructing at least a portion of the entrained droplets 385. The demister 350 can passively demist by a passive demisting portion 395 including, for example, one or more screens, filters, fin matrixes, wire meshes, stacked wire meshes, or the like. The passive demisting portion 395 of the demister 350 can be disposed in the housing 310 for demisting (e.g., removing entrained droplets 385 from the vapor stream 380).

In some embodiments, the first working fluid stream of the vapor heater of the demister 350 can be in fluid communication with the inlet 320. The vapor side of the vapor heater can be in thermal communication with the vapor stream 380 with the entrained droplets 385. In some embodiments, the working fluid from the inlet 320 into the housing 310 can have a higher temperature and/or pressure than the working fluid in the vapor stream 380, allowing thermal energy to be transferred from the working fluid in the tube side to the vapor stream 380, evaporating the entrained droplets 385. For example, the working fluid from the inlet 320 can be received from a condenser (e.g., condenser 120 shown in FIG. 1) or another separator (e.g., separator 240 shown in FIG. 2). In some embodiments, the vapor stream 380 can be heated by the demister 350, providing a superheated vapor stream. In some embodiments, the vapor heater can be a portion or segment of conduits disposed in the headspace 390 configured to evaporating the entrained droplets 385. In some embodiments, the demister 350 can include a gas or electric heater to provide thermal energy for evaporating, heating, and/or controls (e.g., during start-up).

In some embodiments, the demister 350 can include the passive demisting portion 395 disposed in the headspace 390. The passive demisting portion 395 can be integrated portion of the demister 350 (e.g., the fin matrix) or a separate structure (e.g., screens, filters, fins, or the like). In some embodiments, the passive demisting portion 395 is disposed in the headspace 390 near the demister 350 or near the vapor stream outlet 330. In some embodiment, the demister 350 can have structure(s) that demists the vapor stream 380 actively and/or passively. For example, a fin matrix can increase heat transfer and create one or more tortuous paths on the demister 350. In some embodiments, a demister can be active, passive, or a combination thereof.

In some embodiments, the demister 350 can have, for example, a fin matrix that includes plurality of fins. The fin matrix can increase heat transfer area of the vapor heater of the demister 350. In some embodiments, the fin matrix can passively demister the vapor stream 380 by creating a tortuous path or paths for the vapor stream to flow through. The tortuous paths can increase entrained droplet collisions to promote demisting of the vapor stream 380. For example, the tortuous paths can rapidly change the flow direction of the vapor stream so that the entrained droplets may collide with the fin due to inertia. Droplets colliding into the fins can adhere to each other and forming larger droplets. The larger droplets are more likely to drop downward and thereby demisting the vapors stream.

The liquid stream outlet 340 can be disposed at or near the lower portion 370 of the housing 310. The liquid stream outlet 340 can provide the working fluid in a liquid form, or a predominantly liquid form. In some embodiments, the liquid stream outlet 340 can be provided to the first liquid-vapor separator 140 for further evaporation. In some embodiment, all or nearly all the working fluid entering into the liquid-vapor separator 300 being evaporated into the vapor stream 380 (e.g., the liquid-vapor separator 140, or the liquid-vapor separator 140 with the first expander 130 disposed in the housing 145). The liquid stream outlet 340 is optional or is configured to be a clean out port.

It is appreciated that the liquid-vapor separator 300 can include an economizer, a flash tank, an evaporator, or the like. The evaporator can be, for example, an evaporator of a chiller such as a water chiller, a cooling coil of an HVACR unit, or the like. For example, the liquid-vapor separator 300 can be the first liquid-vapor separator 140, the second liquid-vapor separator 240, the first liquid-vapor separator 140 with the first expander 130 contained in the first housing 145, the second liquid-vapor separator 240 with the second expander 230 contained in the first housing 245. It is further appreciated that the expander 355 can be disposed within the housing 310 or outside the housing 310. It is also appreciated that, in the illustrated example of the liquid-vapor separator 300, the conduits between the inlet 320 and the expander 355 can be entirely contained within the housing 310. In some embodiments, at least a port of the conduits and/or the expander 355 can be disposed outside the housing 310.

Figure 5:
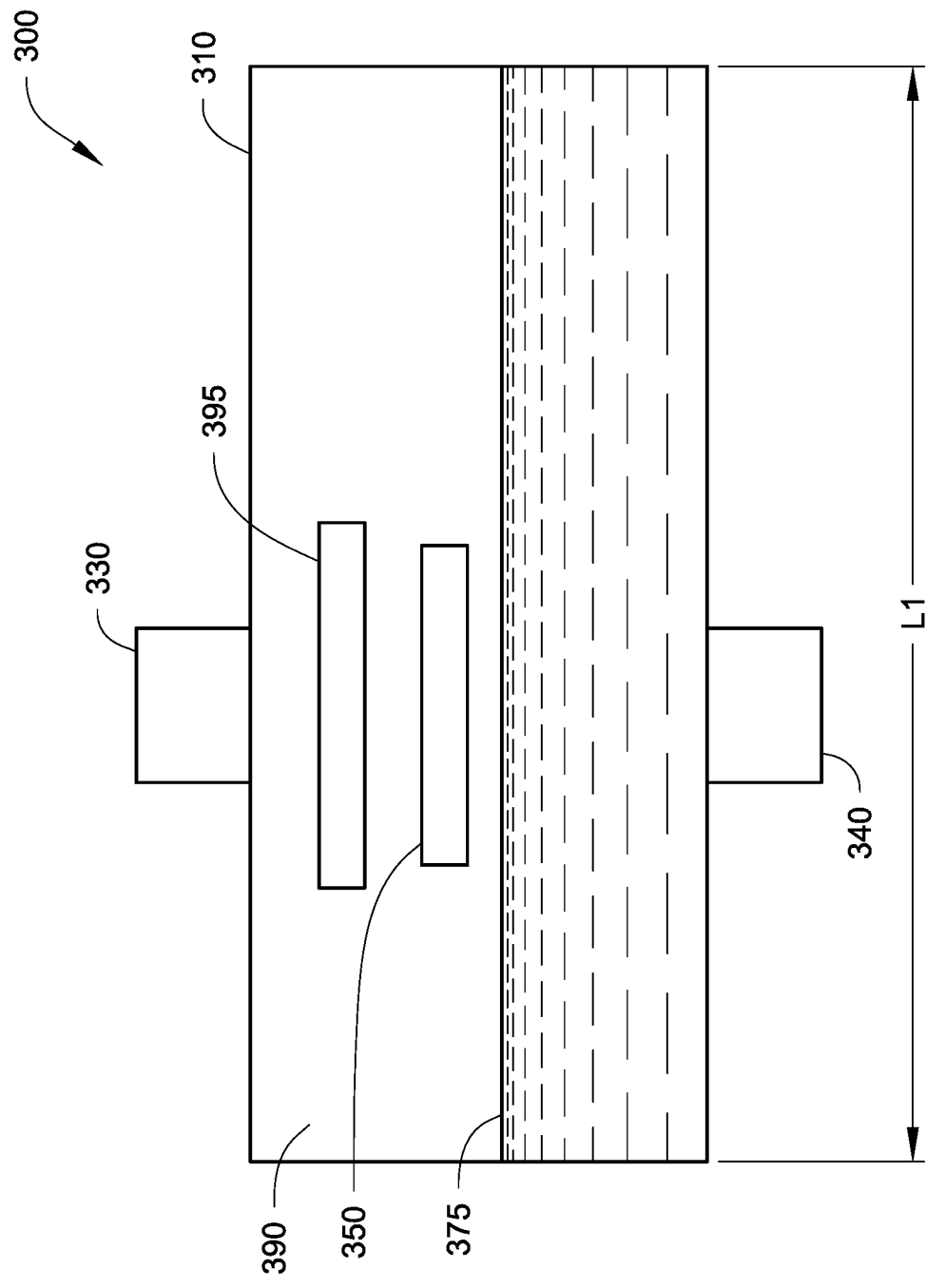
FIG. 5 is a cross-sectional view of the liquid-vapor separator of FIG. 3, according to some embodiments.

FIG. 5 is a cross-sectional view of the liquid-vapor separator 300 of FIG. 3, according to some embodiments. The cross-sectional view can be a view along the length L1 to illustrate the structure of the liquid-vapor separator 300.

As shown in FIG. 5, the demister 350 can be disposed in the headspace 390 near the liquid-vapor interface 375. The demister 350 occupies a portion of the length L1 of the housing 310. It is appreciated that the demister 350 can occupy a portion or the full length L1 of the housing 310.

As shown in FIG. 5, the passive demisting portion 395 can be disposed in the headspace 390 near the liquid-vapor interface 375. The passive demisting portion 395 is further disposed between the vapor stream outlet 330 and the demister 350. It is appreciated that the passive demisting portion 395 and the demister 350 can be disposed in any order or positional relationship (e.g., stacked, overlapped, intertwined, staggered, or the like).

As shown in FIG. 5, the passive demisting portion 395 can occupy a portion of the length L1 of the housing 310. It is appreciated that the passive demisting portion 395 can occupy a portion or the full length L1 of the housing 310.

As shown in FIG. 5, the passive demisting portion 395 is disposed near the demister 350 and the liquid vapor interface 375. It is appreciated that the demister 350 and/or the passive demisting portion 395 can be disposed anywhere in the headspace 390 (e.g., near the liquid-vapor interface 375, near or in the vapor stream outlet 330, or the like).

Figure 6:
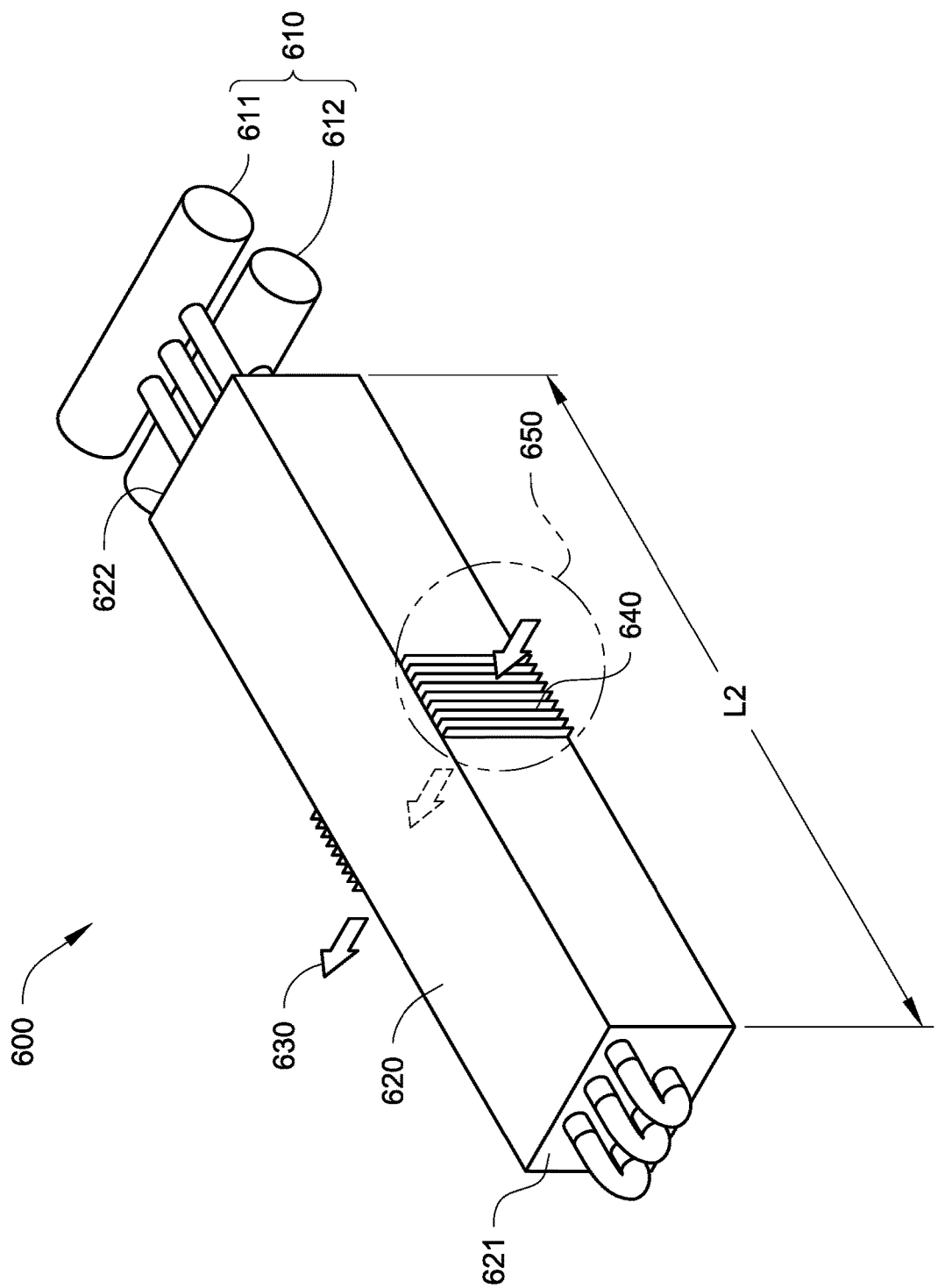
FIG. 6 is a perspective view of a demister, according to an embodiment.

FIG. 6 is a perspective view of a demister 600, according to an embodiment. The demister 600 can be the demister 350 as shown and described above.

As illustrated in FIG. 6, the demister 600 has a demister frame 620. The demister frame 620 has a length L2 with a first end 621 and a second end 622. A plurality of sides can be disposed between the ends 621, 622. A working fluid inlet 611 and a working fluid outlet 612, and a fin matrix 640 having a plurality of fins are disposed on the demister frame 620. It is appreciated that the working fluid inlet 611 and the working fluid outlet 612 can be disposed on the same or different end of the demister 600.

The demister 600 can be a vapor heater, having a tube side 610 and a vapor side 630. The tube side 610 is configured to accept the working fluid (e.g., refrigerant, water, water mixtures, or the like) to exchange thermal energy with a vapor stream (e.g., vapor stream 380) on the vapor side 630. The working fluid inlet 611 in fluid communication with the working fluid outlet 612 is disposed on the tube side 610 of the demister 600.

In some embodiments, the tube side inlet 611 can be in fluid communication with the inlet 320 (shown in FIG. 4) and the tube side outlet 612 can be in fluid communication with the expander 355 (shown in FIG. 4). The vapor stream 380 with the entrained droplets 385 (shown in FIG. 4) can flow through the vapor side 630. It is appreciated that the fin matrix 640 can occupy a portion of a full length L2 of the demister 600.

Figure 7:
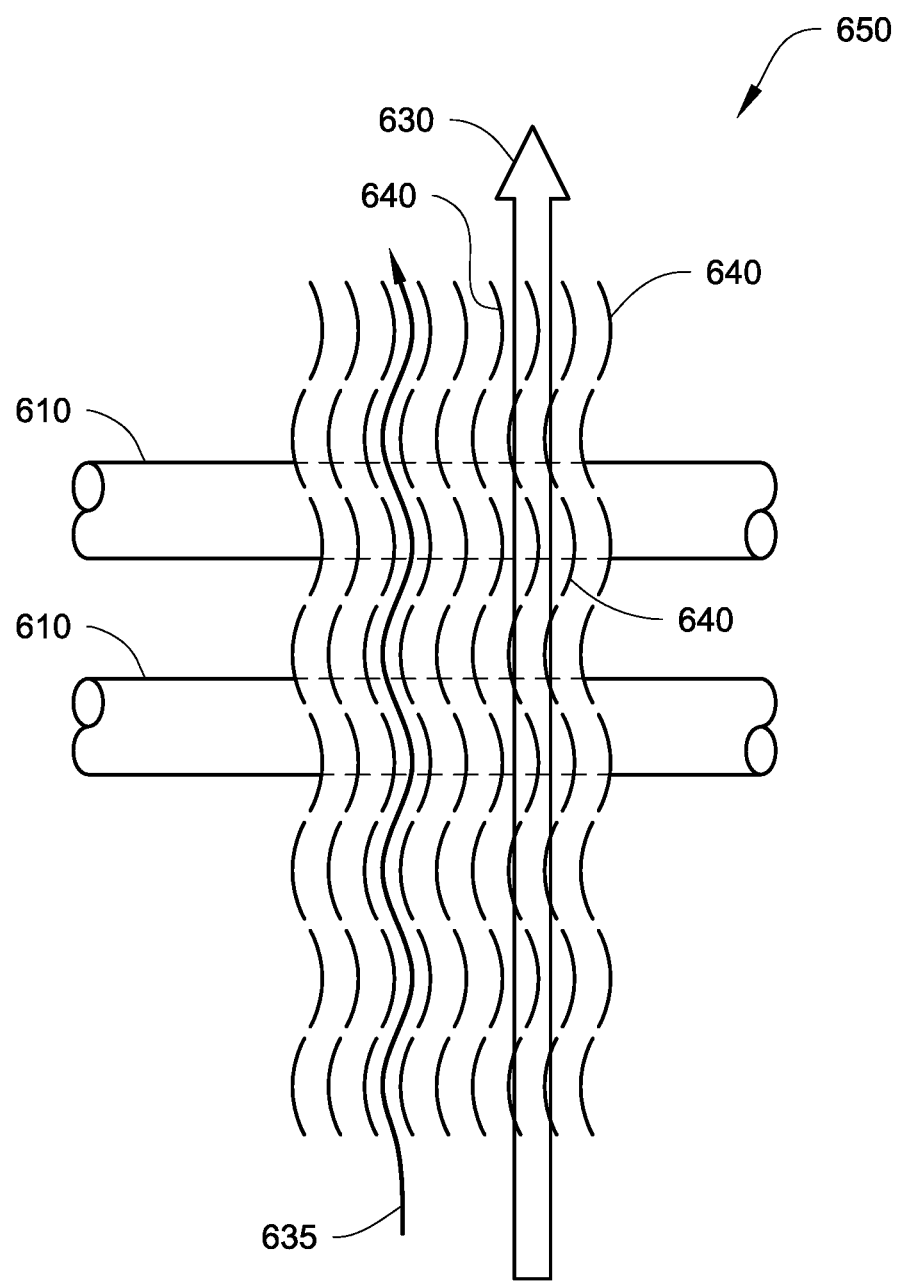
FIG. 7 is a detail view of the demister of FIG. 6, according to an embodiment.

FIG. 7 is a detail view 650 of the demister 600 of FIG. 6, according to an embodiment. The detailed view 650 can be along the direction of the length L2. On the vapor side 630 of the demister 600, the fin matrix 640 can create one or more tortuous paths 635 for the vapor stream (e.g., the vapor stream 380 with entrained droplets 385) so that the vapor stream is forced to flow in a zig-zag or wavy manner to increase the likelihood that the entrained droplets will collide, adhere, and/or be obstructed by the fin matrix 640. Droplets collide, adhere, and/or be obstructed by the fin matrix 640 are more likely to absorb thermal energy from the tube side 610 and be evaporated into a vapor phase so that the vapor stream 380 can be at least partially demisted.

Figure 8:
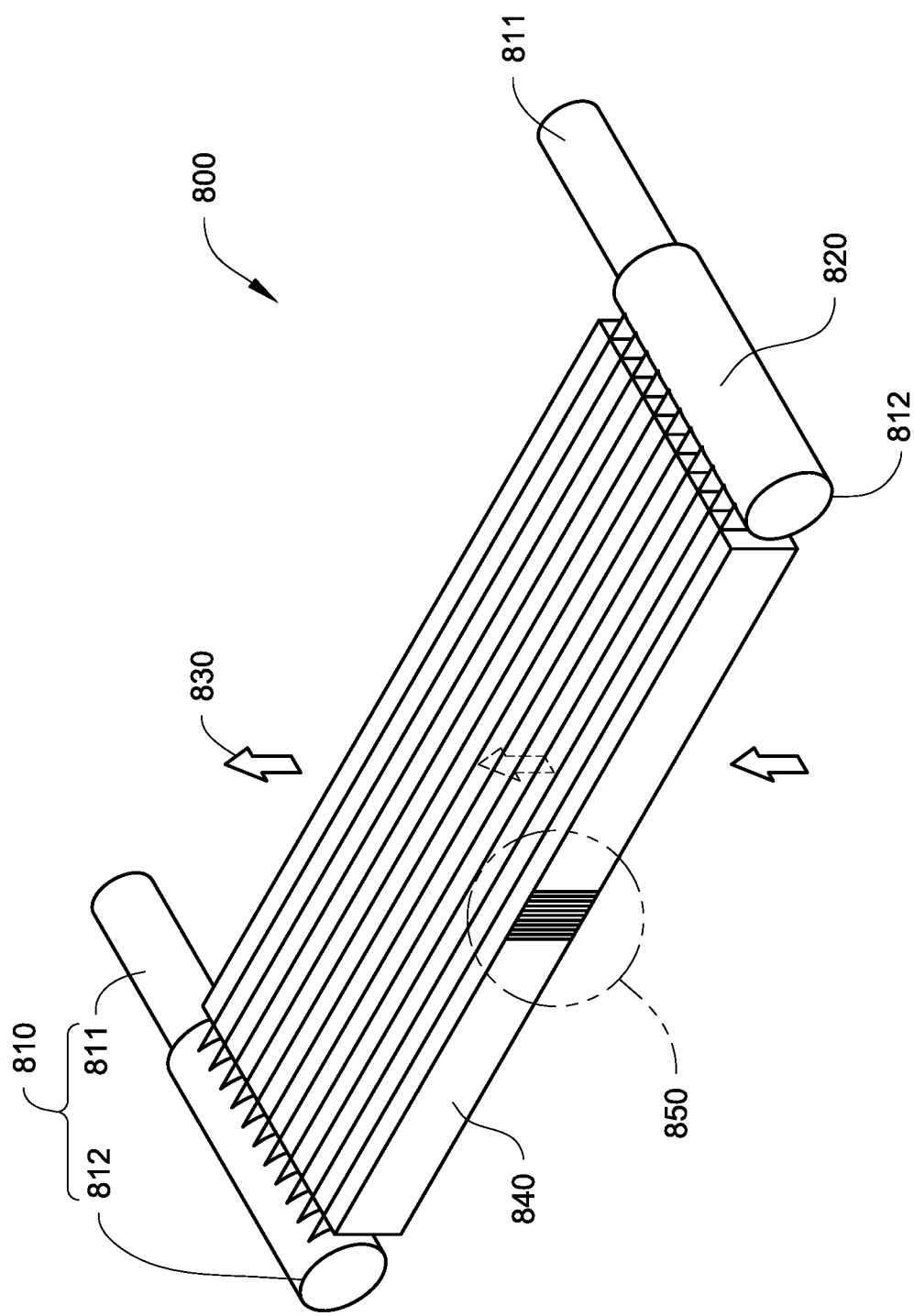
FIG. 8 is a perspective view of a demister, according to an embodiment.

FIG. 8 is a perspective view of a demister 800, according to an embodiment. The demister 800 can be the demister 350 as shown and described above. As illustrated in FIG. 8, the demister 800 has a demister frame 820. A working fluid inlet 811 and a working fluid outlet 812, and a fin matrix 840 are disposed on the demister frame 820.

The demister 800 can be a vapor heater, having a tube side 810 and a vapor side 830. The tube side 810 is configured to accept the working fluid (e.g., refrigerant, water, water mixtures, or the like) to exchange thermal energy with a vapor stream (e.g., vapor stream 380) on a vapor side 830. The working fluid inlet 811 in fluid communication with the working fluid outlet 812 is disposed on the tube side 810 of the demister 800.

In some embodiments, the tube side inlet 811 can be in fluid communication with the inlet 320 (shown in FIG. 4). The tube side outlet 812 can be in fluid communication with the expander 355 (shown in FIG. 4). The vapor stream 380 with the entrained droplets 385 (shown in FIG. 4) can flow through the vapor side 830.

Figure 9:
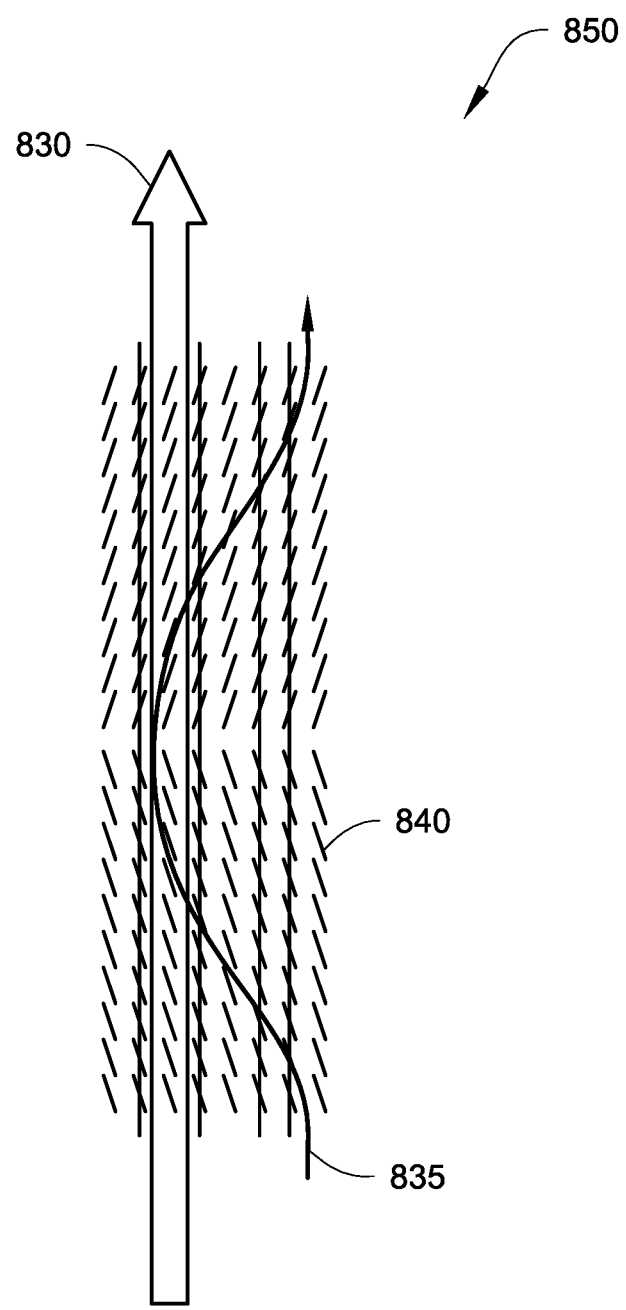
FIG. 9 is a detail view of the demister of FIG. 8, according to an embodiment.

FIG. 9 is a detail view 850 of the demister 600 of FIG. 8, according to an embodiment. On the vapor side 830 of the demister 800, the fin matrix 840 can create one or more tortuous paths 835 for the vapor stream (e.g., the vapor stream 380 with entrained droplets 385) so that the vapor stream is forced to flow in a zig-zag or wavy manner to increase the likelihood that the entrained droplets will collide, adhere, and/or be obstructed by the fin matrix 840. Droplets collide, adhere, and/or be obstructed by the fin matrix 840 are more likely to absorb thermal energy from the tube side 810 and evaporated into a vapor phase so that the vapor stream 380 can be at least partially demisted. Comparing to the embodiment of FIG. 7, the fin matrix 840 can be louvered fins.

Figure 10:
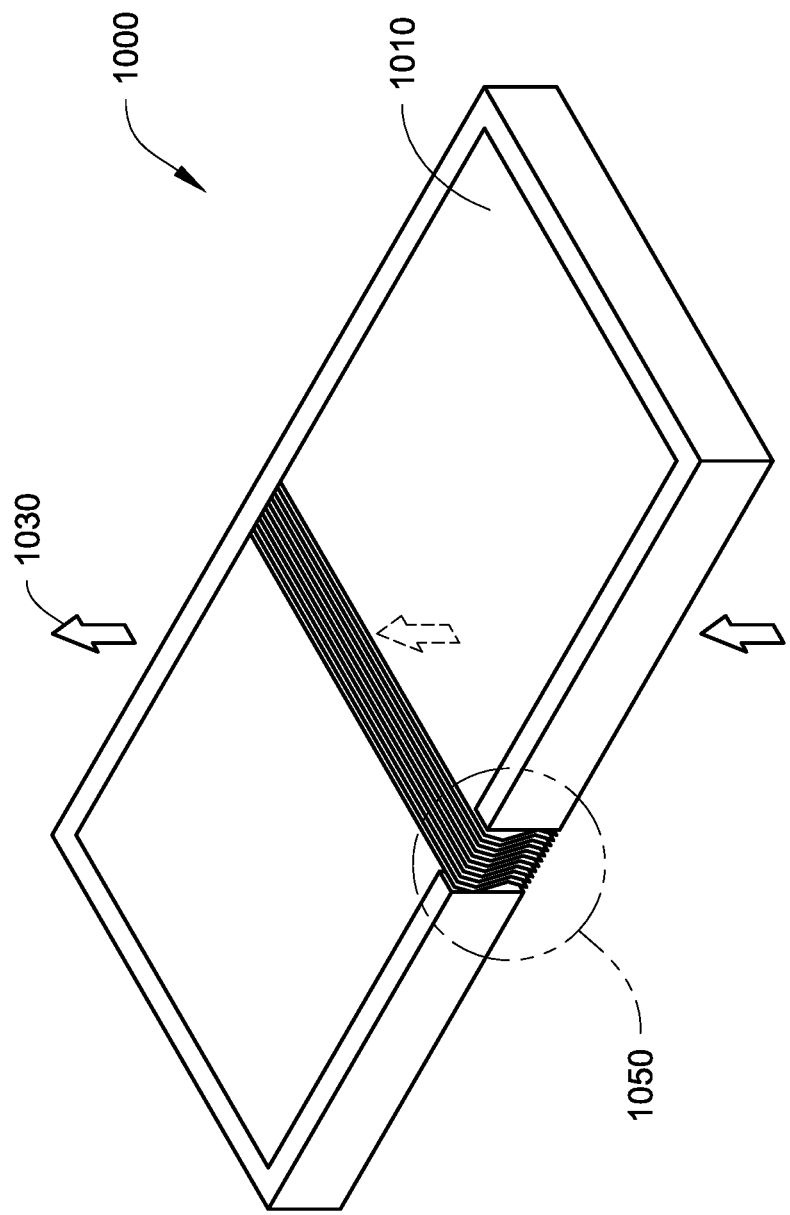
FIG. 10 is a perspective view of a demister, according to an embodiment.

FIG. 10 is a perspective view 1050 of demister 1000, according to an embodiment. The demister 1000 can be the passive demisting portion 395 as shown and described in FIG. 4. The demister 1000 can include a demister body 1010. The demister body 1010 be a block of porous material or porous structure so that a vapor stream 1030 can pass through the demister body 1010. In some embodiments, the vapor stream 1030 can be the vapor stream 380 as shown and described in FIG. 4. The demister body 1010 can demist the vapor stream 1030 by providing surface area and/or tortuous paths for the entrained droplets (e.g., 385) to adhere, collide, and/or be obstructed by each other or to the demister body 1010, demisting the vapor stream 1030. In some embodiments, the demister body 1010 electrostatically charged to demist the vapor stream 1030.

Figure 11:
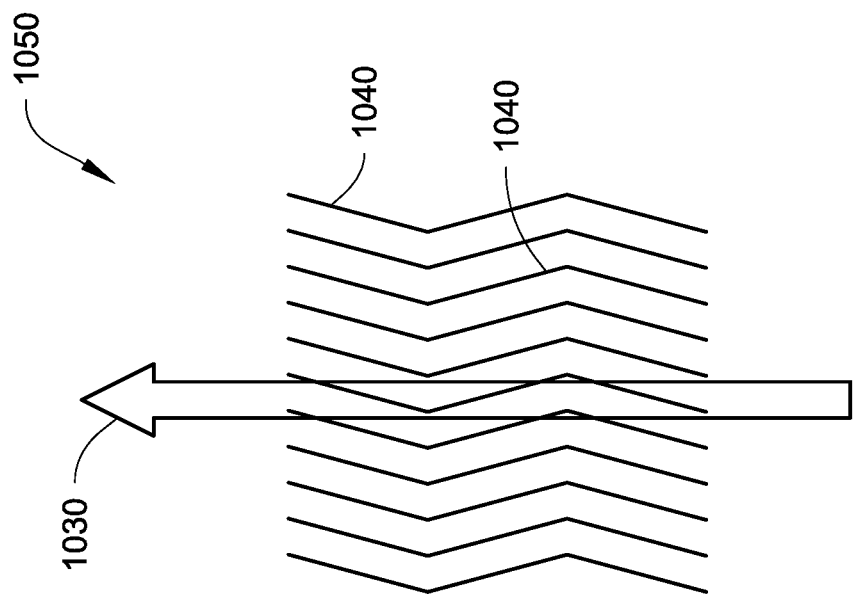
FIG. 11 is a detail view of the demister of FIG. 10, according to an embodiment.

FIG. 11 is a detail view 1050 of the demister 1000 of FIG. 10, according to an embodiment. The demister body 1010 can include a plurality of vanes 1040 arranged to create a plurality of tortuous paths for demisting the vapor stream 1030. In some embodiments, the demister 1000 with vanes can be a vane assembly, a vane demister pad, or the like.

Figure 12:
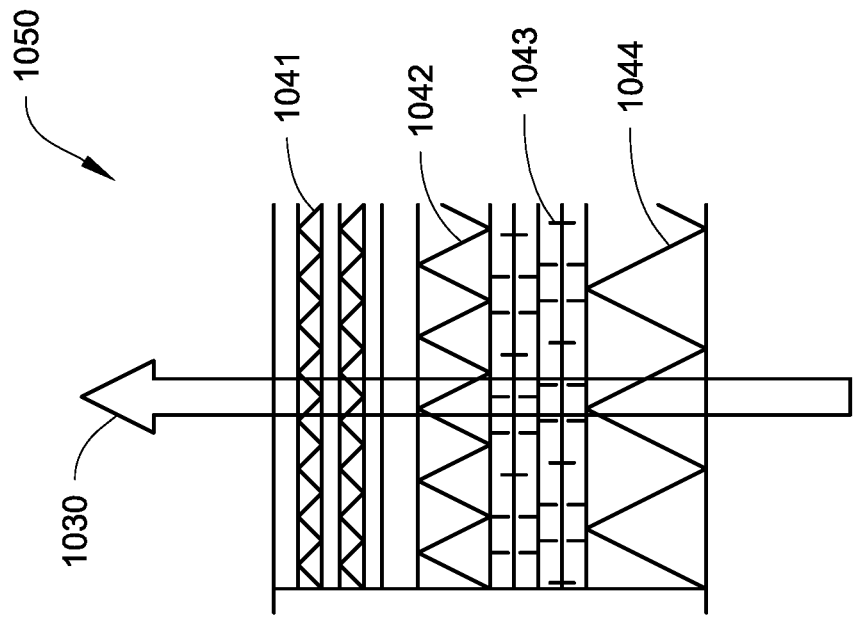
FIG. 12 is a detail view of the demister of FIG. 10, according to another embodiment.

FIG. 12 is a detail view 1050 of the demister 1000 of FIG. 10, according to another embodiment. The demister body 1010 can include a stack of meshes 1041-1044 having the same or different patterns arranged to create a plurality of tortuous paths for demisting the vapor stream 1030. It is appreciated that the number of layers of meshes stacked can be more or less than the illustrated four layers. In some embodiments, the layers of meshes can be knitted, staggered, intertwined, or otherwise arranged with each other to provide tortuous paths. In some embodiments, the demister 1000 with stacked meshes can be a wire mesh demister, a metal wire demister, or the like.

Aspects:

It is understood that any of aspects 1-8 can be combined with any of aspects 9-11 or 12-16. It is further understood that any of aspects 9-11 can be combined with any of aspects 12-16.

Aspect 1. A liquid-vapor separator, comprising:
a housing;
an inlet disposed on the housing and configured to receive a working fluid into the housing; a vapor stream outlet disposed on the housing and configured to release a vapor stream of the working fluid; and
a demister disposed in the housing and configured to transfer thermal energy between the working fluid and the vapor stream, such that at least a portion of the entrained droplets absorb thermal energy from the working fluid to evaporate said portion of the entrained droplets when the vapor stream flows through the demister.

Aspect 2. The liquid-vapor separator according to aspect 1, further comprising an expander disposed in the housing, wherein the expander is configured to expand the working fluid.

Aspect 3. The liquid-vapor separator according to any of aspects 1-2, further comprising a heat exchange module disposed in the housing, wherein:
the heat exchange module is configured to supply thermal energy to the working fluid in the liquid-vapor separator and is in thermal communication with the working fluid to supply thermal energy to provide the vapor stream.

Aspect 4. The liquid-vapor separator according to any of aspects 1-3, wherein the demister includes a tortuous path in which at least a portion of the vapor stream flows through.

Aspect 5. The liquid-vapor separator according to aspect 4, wherein a fin matrix disposed on the demister creates the tortuous path.

Aspect 6. The liquid-vapor separator according to any of aspects 1-5, wherein the demister includes a passive demisting portion configured to obstruct at least a portion of the entrained droplets.

Aspect 7. The liquid-vapor separator according to any of aspects 1-6, wherein the demister is configured to electrostatically attract the entrained droplets.

Aspect 8. The liquid-vapor separator according to any of aspects 1-7, wherein the liquid-vapor separator is an evaporator or an economizer.

Aspect 9. A HVACR system, comprising:
a compressor; a condenser; a first expander; and a first liquid-vapor separator in fluid communication, wherein the first liquid-vapor separator includes:
a first housing,
a first inlet disposed on the first housing and configured to receive a working fluid, a first vapor stream outlet disposed on the first housing and configured to release a first vapor stream of the working fluid to the compressor, and
a first demister disposed in the first housing and configured to transfer thermal energy between the working fluid and the first vapor stream, such that at least a portion of the first plurality of entrained droplets absorb thermal energy from the working fluid to evaporate said portion of the first plurality of the entrained droplets when the first vapor stream flows through the first demister.

Aspect 10. The HVACR system according to aspect 9, further comprising:
a second liquid-vapor separator in fluid communication via the working fluid, wherein the second liquid-vapor separator includes:
a second housing,
a second inlet disposed on the second housing and configured to receive the working fluid,
a second vapor stream outlet disposed on the second housing and configured to release a second vapor stream of the working fluid,
a liquid stream outlet disposed on the second housing and configured to release a liquid stream of the working fluid to the first inlet,
a second demister disposed in the second housing and configured to transfer thermal energy between the working fluid and the second vapor stream such that at least a portion of the second plurality of entrained droplets absorbs thermal energy from the working fluid to evaporate said portion of the second plurality of entrained droplets when the second vapor stream flows through the second demister.

Aspect 11. The HVACR system according to any of aspects 9-10, wherein
the first liquid-vapor separator is an evaporator, and
the second liquid-vapor separator is an economizer.

Aspect 12. A method of demisting entrained droplets, comprising:
flowing a working fluid into a liquid-vapor separator, the liquid-vapor separator including a headspace, a heat exchange section, and a demister;
evaporating the working fluid by way of the heat exchange section to obtain a vapor stream of the working fluid, the vapor stream including entrained droplets; and
flowing the vapor stream through a demister;
wherein the vapor stream absorbs heat at the demister such that at least a portion of the entrained droplets are evaporated.

Aspect 13. The method according to aspect 12, further comprising:
receiving the vapor stream at a compressor after the vapor stream has been flowed through the demister; and
compressing the vapor stream using the compressor.

Aspect 14. The method according to any of aspects 12-13, further comprising obstructing passage of at least a portion of the entrained droplets through the demister by way of one or more tortuous paths included in the demister.

Aspect 15. The method according to any of aspects 12-14, further comprising the working fluid passing through an expander to enter the heat exchange section.

Aspect 16. The method according to any of aspects 12-15, wherein the absorption of heat by the vapor stream at the demister superheats said vapor stream The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:
1. A liquid-vapor separator, comprising:
a housing;
an inlet disposed on the housing and configured to receive a working fluid into the housing;
a vapor stream outlet disposed on the housing and configured to release a vapor stream of the working fluid;
a demister disposed in the housing and configured to transfer thermal energy between the working fluid and the vapor stream, such that at least a portion of entrained droplets absorb thermal energy from the working fluid to evaporate said portion of the entrained droplets when the vapor stream flows through the demister;
an expander disposed in a lower portion of the housing, the expander being configured to expand the working fluid; and
a flow path for the working fluid flowing from the demister to the expander, the flow path being disposed within the housing, wherein
the working fluid is received through a conduit fluidly connecting the demister and the inlet, and at least a portion of the conduit is disposed within the housing of the liquid-vapor separator.

2. The liquid-vapor separator of claim 1, further comprising a heat exchange module disposed in the housing, wherein:
the heat exchange module is configured to supply thermal energy to the working fluid in the liquid-vapor separator and is in thermal communication with the working fluid to supply thermal energy to provide the vapor stream.

3. The liquid-vapor separator of claim 1, wherein the demister includes a tortuous path in which at least a portion of the vapor stream flows through.

4. The liquid-vapor separator of claim 3, wherein a fin matrix disposed on the demister creates the tortuous path.

5. The liquid-vapor separator of claim 1, wherein the demister includes a passive demisting portion configured to obstruct at least a portion of the entrained droplets.

6. The liquid-vapor separator of claim 1, wherein the demister is configured to electrostatically attract the entrained droplets.

7. The liquid-vapor separator of claim 1, wherein the liquid-vapor separator is an evaporator or an economizer.

8. A HVACR system, comprising:
a compressor; a condenser; a first expander; and a first liquid-vapor separator in fluid communication, wherein the first liquid-vapor separator includes:
a first housing,
a first inlet disposed on the first housing and configured to receive a working fluid,
a first vapor stream outlet disposed on the first housing and configured to release a first vapor stream of the working fluid to the compressor,
a first demister disposed in the first housing and configured to transfer thermal energy between the working fluid and the first vapor stream, such that at least a portion of a first plurality of entrained droplets absorb thermal energy from the working fluid to evaporate said portion of the first plurality of the entrained droplets when the first vapor stream flows through the first demister,
the first expander disposed in a lower portion of the first housing, the first expander being configured to expand the working fluid, and a flow path for the working fluid flowing from the first demister to the first expander, the flow path being disposed within the first housing, wherein
the working fluid is received through a conduit fluidly connecting the first demister and the first inlet, and at least a portion of the conduit is disposed within the first housing of the first liquid-vapor separator.

9. The HVACR system of claim 8, further comprising:
a second liquid-vapor separator in fluid communication via the working fluid, wherein the second liquid-vapor separator includes:
a second housing,
a second inlet disposed on the second housing and configured to receive the working fluid,
a second vapor stream outlet disposed on the second housing and configured to release a second vapor stream of the working fluid,
a liquid stream outlet disposed on the second housing and configured to release a liquid stream of the working fluid to the first inlet,
a second demister disposed in the second housing and configured to transfer thermal energy between the working fluid and the second vapor stream such that at least a portion of a second plurality of entrained droplets absorbs thermal energy from the working fluid to evaporate said portion of the second plurality of entrained droplets when the second vapor stream flows through the second demister.

10. The HVACR system of claim 9, wherein
the first liquid-vapor separator is an evaporator, and
the second liquid-vapor separator is an economizer.

11. A method of demisting entrained droplets, comprising:
receiving a working fluid into a liquid-vapor separator, the liquid-vapor separator including a headspace, a heat exchange section, and a demister, wherein the working fluid is received through a conduit fluidly connecting the demister and an inlet on the liquid-vapor separator, and at least a portion of the conduit is disposed within a housing of the liquid-vapor separator;
routing the working fluid from the demister to an expander through a flow path that is disposed within the housing,
expanding the working fluid through the expander disposed in a lower portion of the housing,
evaporating the working fluid by way of the heat exchange section to obtain a vapor stream of the working fluid, the vapor stream including entrained droplets; and
flowing the vapor stream through the demister,
wherein the vapor stream absorbs heat at the demister such that at least a portion of the entrained droplets are evaporated.

12. The method of claim 11, further comprising:
receiving the vapor stream at a compressor after the vapor stream has been flowed through the demister; and
compressing the vapor stream using the compressor.

13. The method of claim 11, further comprising obstructing passage of at least a portion of the entrained droplets through the demister by way of one or more tortuous paths included in the demister.

14. The method of claim 11, further comprising the working fluid passing through the expander to enter the heat exchange section.

15. The method of claim 11, wherein absorption of heat by the vapor stream at the demister superheats said vapor stream.

16. The liquid-vapor separator of claim 1, wherein the conduit is disposed entirely in the housing.

17. The HVACR system of claim 8, wherein the conduit is disposed entirely in the housing.

18. The method of demisting entrained droplets of claim 11, wherein the conduit is disposed entirely in the housing.

* * * * *